United States Patent
Morris

(10) Patent No.: US 7,292,579 B2
(45) Date of Patent: Nov. 6, 2007

(54) PROCESSING OPERATIONS ASSOCIATED WITH RESOURCES ON A LOCAL NETWORK

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 201 days.

(21) Appl. No.: 11/117,907

(22) Filed: Apr. 29, 2005

(65) Prior Publication Data

US 2006/0245431 A1 Nov. 2, 2006

(51) Int. Cl.
  *H04L 12/28* (2006.01)
  *H04Q 7/24* (2006.01)
  *G06F 15/16* (2006.01)

(52) U.S. Cl. .................. 370/395.4; 370/338; 370/398; 709/203

(58) Field of Classification Search ............. 370/395.4, 370/428, 395.21, 389, 398, 338, 346, 401; 709/201, 203, 217, 220, 223–229
See application file for complete search history.

(56) References Cited

U.S. PATENT DOCUMENTS

| | | | |
|---|---|---|---|
| 5,787,442 A | 7/1998 | Hacherl et al. | 707/201 |
| 6,314,459 B1 | 11/2001 | Freeman | 709/220 |
| 6,604,127 B2 * | 8/2003 | Murphy et al. | 709/203 |
| 6,643,650 B1 | 11/2003 | Slaughter et al. | 707/10 |
| 6,832,223 B1 | 12/2004 | Scheifler et al. | 707/10 |
| 6,845,393 B1 | 1/2005 | Murphy et al. | 709/220 |
| 2001/0002473 A1 | 5/2001 | Waldo et al. | 709/229 |
| 2002/0147797 A1 | 10/2002 | Paul | 709/220 |
| 2003/0084116 A1 | 5/2003 | Musante et al. | 709/217 |
| 2003/0097425 A1 | 5/2003 | Chen | 709/220 |
| 2003/0204756 A1 * | 10/2003 | Ransom et al. | 713/300 |
| 2004/0103183 A1 | 5/2004 | Ku et al. | 709/223 |
| 2004/0136027 A1 | 7/2004 | Zehler | 358/1.15 |
| 2004/0193609 A1 | 9/2004 | Phan et al. | 707/10 |
| 2005/0050181 A1 | 3/2005 | Morioka | 709/221 |
| 2005/0055352 A1 | 3/2005 | White et al. | 707/10 |

\* cited by examiner

*Primary Examiner*—Afsar Qureshi

(57) ABSTRACT

Preferred embodiments of the invention provide a method and system for processing operations associated with resources on a local network. Aspect of the invention include receiving periodic messages containing resource information from network devices connected to the local network, wherein the resource information includes user-requestable services offered by the network device, and data stored by the network device having a mime type. The resource information from each of the messages and a timestamp are stored in a repository. From the stored timestamp and resource information it can be determined which user-requestable services and data having a mime type were available on the network over a predetermined time period. A view of the user-requestable services and data having a mime type that were available on the network over the predetermined period can then be generated, thereby enabling generation of current, past, and dynamic views of the user-requestable services offered by devices connected to the network and the data having a mime type stored by the devices. In a further embodiment, the system enables operations associated with the resources to be performed or scheduled at a time when the resources are unavailable via the network by performing or scheduling the operations on the corresponding resource identifiers stored in the repository.

51 Claims, 6 Drawing Sheets

PROCESSING OPERATIONS ASSOCIATED WITH RESOURCES ON A LOCAL NETWORK

FIELD OF THE INVENTION

The present invention relates to local area networks and more particularly to a method and system for processing operations associated with resources on a local network.

BACKGROUND OF THE INVENTION

Home networks are growing rapidly. Many homes now have more than one PC or laptop computer. TV and audio equipment with networking capabilities are available and are expected to be adopted rapidly. Numerous other devices with network capabilities are also available including digital still and movie cameras, mobile phones, PDA's, and even appliances. Currently there is no method or system which allows a user to generate views or pictures of all the user's devices on the LAN.

In business networks, network management protocols such as Simple Network Management Protocol (SNMP) and SNMP managers allow system administrators to get views of the enterprise network. These views are management views, in that they allow the user to see various pieces of hardware and system software and to view and set configuration and administration data. There a no such managers that allows one to view the various device file systems as a whole, much less locate a particular file or set of files. Similarly while one can find a printer in such a system, one cannot use the network management system to configure a PC on the network to use the printer, much less use it to print a document.

The Java community has a directory service called JINI that allows Java programs to advertise, discover, and access user-requestable services offered on the JINI network. As such JINI, is a framework which enables integration of a collection of networked services, but it does not perform the integration. It's limited to Java programs only. Thus, a device which does not support Java cannot participate. Further, JINI presents no integrated view of the resources (i.e. data and services on the network). JINI is service oriented not data oriented. While one can find a printer on a JINI server, one cannot search for say all the files on the network that are image files.

SAMBA is a protocol in wide-use on local area networks today. It can run over NetBIOS or TCP/IP. SAMBA allows devices to announce their presence on the SAMBA network and to advertise file systems and printers which they share. A user can browse a SAMBA network and search for a specific device, shared folder, or printer. SAMBA, however, provides no general query mechanism. For example, if a digital still camera attaches to a network and is SAMBA enabled, the camera appears as just another device with shared folders. SAMBA cannot inform the user that the device is a camera, and SAMBA cannot indicate that it contains image files (without the user manually browsing the cameras shared folders).

HAVI is specification for home network for consumer electronic devices. It does maintain a dynamic directory of devices, and it enables advertising and discovery of available services. It, like JINI, is based on Java and is an enabling technology. Also, like JINI it is service and device oriented, not data oriented.

Universal Plug and Play (UPnP) is standard with some similarities to JINI in HAVI. That is, it provides a protocol for device and service discovery. It differs in that it is a peer-to-peer architecture. That is, no central directory is required. One or more "control points" listen for device and service advertisements which interest the control points. Control points can broadcast request to discover devices and services, as well With conventional methods, one can create systems that allow various subsets of network resources to be cataloged and possibly displayed in a manner showing the relationships between the resources. But no current network application allows for a complete view of network resources to be created which reflects the relationships among the resources, is navigable through those relationships, is searchable by resource name, type, or other metadata attribute presence or value.

Conventional views of the network resources are shallow and inflexible in what they track, the level of detail tracked, and the length of time tracked. The content managed by a device (e.g., a camera) or a service (e.g., a storage service like a hard-drive, or web service like a web site) cannot be determined in any uniform way, nor can it be accessed through any uniform interface. To get at the camera's content one would need to use the camera's service interface. However, there are no standards at this time for such interfaces. Even with standards, vendors are allowed to provide proprietary extensions. A camera's service interface is different from a hard drive's service interface which differs from web site's service interface. (One can extend the basic UPnP, JINI interfaces to describe each resource as a service, but this is an inefficient solution. The discovery protocols would flood the system given the dynamic nature of many resources, such as files on a hard drive.)

Further the conventional methods fail to provide a view of the network based on history (recent or long-term). For example, it would be useful to see all the devices and resources which where attached to a network in a given time period, perhaps the last day. None of the above systems support a general search capability for network services and resources. For example, a user can't ask to see all the images available on the network, a particular device, or a particular type of device (such as "find all where resource=image/jpeg and service=camera/still). In fact, today there is no tool or service that enables a user to submit a request to see all the printers on a network. As another example, a photo organizing application cannot detect or find the presence of a device with new images on the network, so a photo organizing application cannot automatically import the images from the device. It will be able to detect devices with storage drives and it will be able to detect cameras (once vendors define the profiles). The software, at this point presumably, would have to browse the device or service searching for resources of interest. The interfaces for these different devices and services will vary, so the software would have to be familiar with each profile.

BRIEF SUMMARY OF THE INVENTION

The present invention provides a method and system for processing operations associated with resources on a local network. Aspects of the invention include receiving periodic messages containing resource information from network devices connected to the local network, wherein the resource information includes user-requestable services offered by the network device, and data stored by the network device having a mime type. The resource information from each of the messages and a timestamp are stored in a repository. From the stored timestamp and resource information it can be determined which user-requestable services and data having a mime type were available on the network over a predetermined time period. A view of the user-requestable services and data having a mime type that were available on the network over the predetermined period can then be generated, thereby enabling generation of current, past, and dynamic views of the user-requestable services offered by devices connected to the network and the data having a mime type stored by the devices.

In a further embodiment, the system enables operations associated with the resources to be performed or scheduled at a time when the resources are unavailable via the network by performing or scheduling the operations on the corresponding resource identifiers stored in the repository.

According to the method and system disclosed herein, the present invention provides a standard mechanism for obtaining metadata for each device, service, and data/content entity on a local network. The submission and storage of this metadata enables users, devices, and software on a local network to be able to determine not only the devices and services available on the network currently, but also over a specified period of time. The present invention can therefore provide a unified view of all the resources accessible on the local network at a given time or over a given time period. The present invention also provides a general command queuing system that allows users, devices, and service to issue commands against resources whether or not the resources are currently available on the network.

DETAILED DESCRIPTION OF THE INVENTION

The present invention relates to processing operations associated with resources on a local network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a network topology service that maintains a repository of all resources including devices, requestable services, and files, connected to the local network over time. The network repository may provide a directory of the names of files and devices (e.g., printers, servers) and may also cache a copy of the files themselves. The network topology service enables users to perform operations on the resources in the repository, including dynamically creating historical views of resources on the local network, such as current and past views of as well as dynamic views of the local network topology over a period of time, similar to time-lapse photography. If implemented in a mobile client device, the network topology service provides a searchable view of all network places a client device connects to during a given period (e.g., during the day). The directory can then be searched to locate files and devices that at one time during the period were connected and available to the client device.

The present invention also provides a general command queuing system that allows users, devices, and services to issue commands against resources whether or not the resources are currently available on the network, such that when the devices/services/files become available (e.g., through a reconnection), the scheduled actions are automatically performed.

Figure 1:
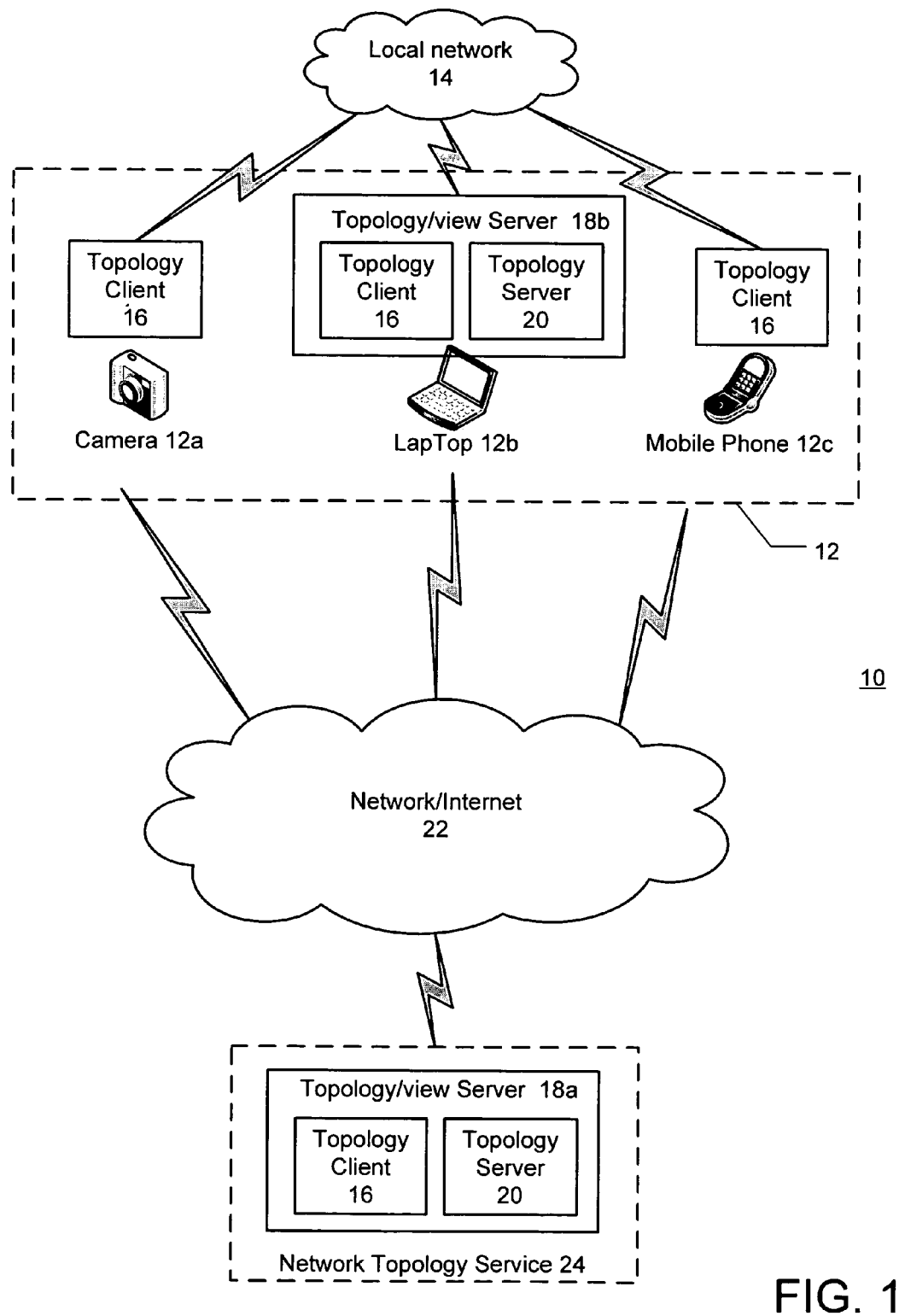
FIG. 1 is a block diagram illustrating a network architecture for processing operations associated with resources on a local network in a preferred embodiment of the present invention.

FIG. 1 is a block diagram illustrating a network architecture for processing operations associated with resources on a local area network in a preferred embodiment of the present invention. The architecture 10 includes one or more network devices 12a-12c (collectively referred to as network devices 12) that are capable of communicating with a local network 14 and that have been provided with a topology client 16 application. As used herein, the term network devices 12 is intended to mean end-user type devices, such as digital cameras, cell phones, computers, MP3 players, storage devices, printers, and so on, as opposed to network infrastructure type devices, such as hubs, routers, and firewalls. For instance, the architecture 10 also includes one or more topology/view servers 18a and 18b (referred to collectively as topology/view server 18) that provide services for the local network 14 through the topology clients 16.

According to one embodiment, the topology client 16 is configured to gather resource information regarding both the respective network device 12 in which it resides, as well as resources connected directly to the device 12, or indirectly to the device 12 via the local network 14. The topology client 16 also periodically transmits the resource information to the topology/view server 18 for storage/archival. The topology client 16 may communicate with the topology/view server 18 through either a wired or wireless network connection.

The topology/view server 18 includes a topology client 16 and a topology server 20. Two embodiments are shown for the topology/view server 18. In the first embodiment, a centralized topology/view server 18a is provided as part of a topology service 24 site on a network 22, such as the Internet, whose location and network address are fixed. One or more configured backup view/topology servers (not shown) may also be provided on the network 22. In the centralized embodiment, the topology clients 16 gather the resource information and then periodically transmit the resource information in the form of a time-stamped message to the topology/view server 18a for storage.

In a preferred embodiment, the resource information gathered by the topology client 16 may include user-requestable services offered by the network device 12, and data stored by the network device 12 having a multi-purpose internet mail extensions (mime) file type, which is a well-known protocol for identifying file types such as .jpg, .mp3, .pdf, and so on. Each type of resource gathered by the topology client 16 is preferably addressable via a uniform resource locator (URL). In a preferred embodiment, each resource is identified by a resource ID, which may be a name or URL for example. An example of a user-requestable service offered by the network device 12 is the ability to print. The resource information may also include attributes of the resource information. Examples of resource attributes include print speed for the print service, and the sizes and creation dates of the files and folders stored by the device 12.

In the second embodiment, the topology/view server 18*b* is implemented within a mobile network device 12*b*, thereby becoming a mobile topology/view server 18*b* whose location and network address varies. In the mobile embodiment, the local network 14 for which the topology clients 16 gathers resource information is defined as any local network the mobile device 12*b* connects with over a period of time. Also, the network resource information is stored by the topology/view server 18*b* locally within the device 12*b*. The fixed and mobile embodiments of the topology/view server 18*a* and 18*b* can operate independently or cooperatively in discovering and exchanging network resource information.

In a third alternative embodiment (not shown), the topology/view server 18 may be implemented by distributing functions of the topology/view server 18 among various network devices 12 on the network, i.e., as in a peer-to-peer architecture.

Prior to use, a user registers both himself and his or her device 12 with the topology server 18. In addition, the user may set preferences that configure both the scope and depth of the resource information the topology client 16 should gather and make public via transmission to the topology/view server 18. For example, the user may configure the topology client 16 to only share user-requestable services offered by the device 12 and its file directory structure to a depth of three folders deep. Likewise, the topology/view server 18 may also be configured (e.g., by an administrator of the topology service 24) to only store network resource information of particular types and depths.

As described above, the resource information the topology clients 16 are configured to gather is preferably transmitted to the topology/view server 18 by the topology clients 16 in the form of periodic messages that include a time stamp or are time stamped by the topology server 18. As the topology/view server 18 receives the periodic messages, the topology/view server 18 stores the resource information and timestamps to build a history of the resources of the local network 14. Thereafter, the topology/view server 18 uses this history to respond to user requests to view the network devices and resources currently available on the network 14, or to view a history of the resources that were accessible on the local network 14 over some specified period of time. By storing periodic snapshots of resources connected to the local network 14, the topology/view server 18 makes it easy for users to locate needed services and data on the local network 14 through one interface, as well as support other applications.

According to a further embodiment, the topology/view server 18 is also capable of receiving general commands to perform operations associated with the stored resources. If the resource is available via the network 14 at the time the command is received, then the topology/view server 18 executes the command against the resource. If however, the resource is currently unavailable on the network 14, then the topology/view server 18 either performs the operation on the stored resource identifier corresponding to the target resource, or queues the command by scheduling the operation on the corresponding resource identifier stored in the repository. When the resource becomes available on the network 14, the scheduled operation is then automatically performed on the actual resource.

Figure 2:
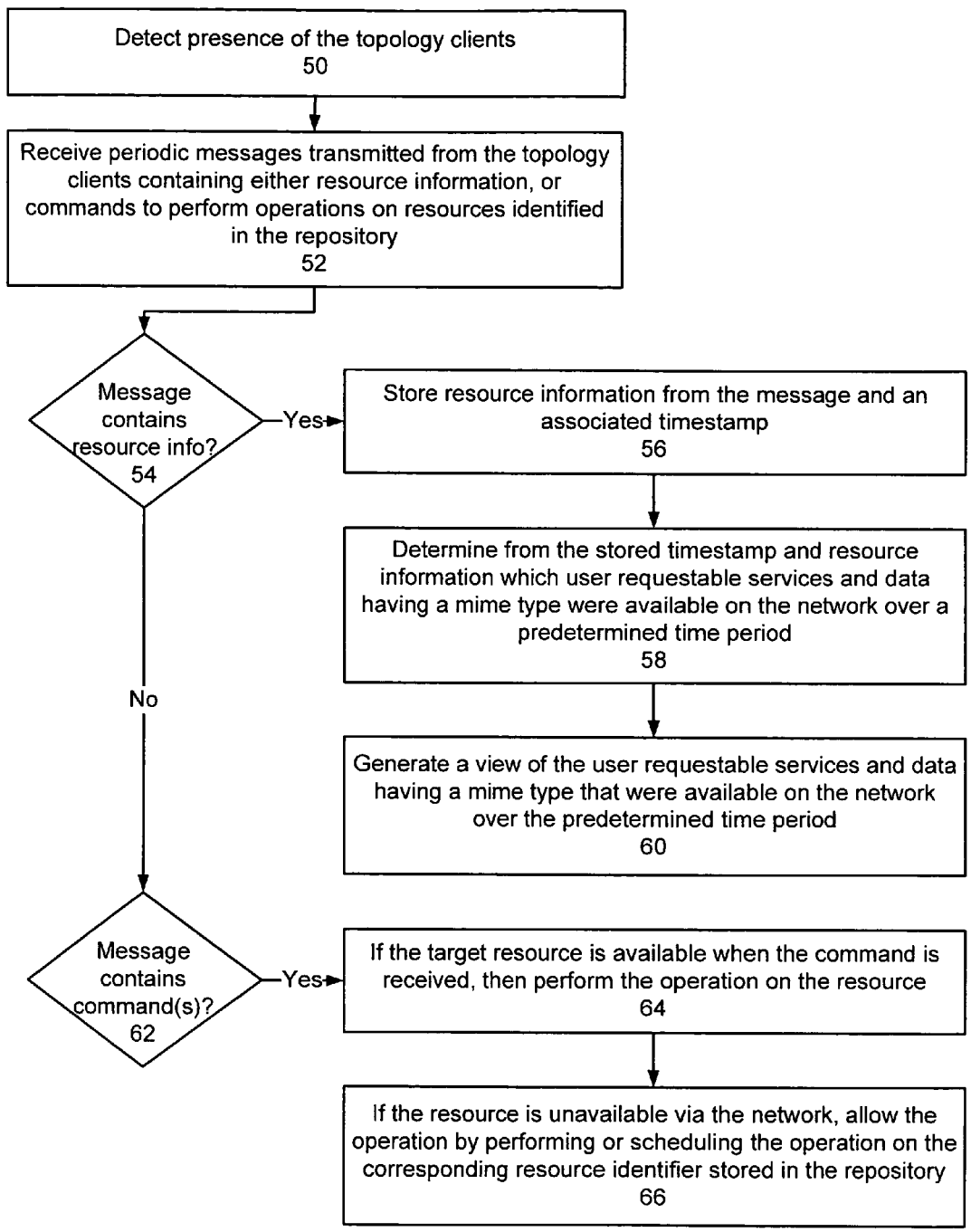
FIG. 2 is a flow diagram illustrating the process for populating and updating the resource repository to support the processing of operations associated with network resources in accordance with a preferred embodiment of the present invention.

FIG. 2 is a flow diagram illustrating the process for populating and updating the resource repository to support performing operations associated with network resources, including off-line resources, in accordance with one embodiment. The process begins in step 50 when the topology/view server 18 detects the presence of one or more topology clients 16 on the network 14 and establishes communication. In the centralized topology/view server embodiment, presence detection between the topology/view server 18*a* and the topology clients 16 is performed over the network 22. In the mobile topology/view server embodiment, the presence detection between the topology/view server 18*b* and the topology clients 16 is performed over the local network 14. In the wireless network embodiment, the topology server 18 may automatically detect the presence of the topology clients 16 as soon as the topology clients 16 come within range of the wireless network.

In a wired network, one embodiment is for the topology/view server 18 to initiate the detection of the topology client 16 by transmitting a heartbeat over the network to the topology clients 16 that includes the address of the topology/view server 18. In a second embodiment, the detection between the topology/view server 18 and the topology clients 16 is initiated by the topology clients 16. The initiation by the topology clients 16 may be implemented in several ways. In the centralized topology/view server embodiment, one implementation is for the topology clients 16 to statically determine the presence of the server 18*a* by transmitting to a known name or address of the server 18*a*. Another implementation is for the topology clients 16 to dynamically determine the address of the server 18 based on negotiation among the connected devices. A third method for the topology clients 16 to obtain the address of the topology server is to use Dynamic Host Configuration Protocol (DHCP) of the Internet. A DHCP server supplies Internet Protocol (IP) addresses when requested by client computers on a TCP/IP network that have TCP/IP configured to obtain their IP addresses automatically. Thus, once the topology/view server 18*a* is a client of the DHCP server, the topology clients 16 can obtain the IP address of the topology server 18*a* from the DHCP server by locating the keyword "topology" in the DCHP server response and using the value associated with the keyword as the address of the topology/view server 18.

After communication is established between the topology/view server 18 and topology client 16, in step 52 the topology/view server 18 receives periodic messages transmitted from the topology clients 16. As stated above, the messages may contain resource information, or commands to perform operations on resources identified in the repository. As described above, the resource information may include data regarding the user-requestable services and mime-type data stored in the topology client's network device 12, as well as the services and data gathered from other devices 12 connected to the topology client 16 and/or the local network. The frequency that the messages containing resource information are sent depends on the configuration of the local network 14 and available bandwidth. The messages may contain a timestamp generated by the client 16, but in the preferred embodiment the server 18 generates a timestamp and associates it with each message as it is processed.

In one embodiment, prior to transmitting the messages containing the network resource information, the topology client 16 may send a message to the topology/view server 18 indicating that topology client 16 is present and the scope and depth of the resource information the topology client 16 is configured to make public. Whether or not the topology/view server 18 receives a message regarding the scope and depth of the resource information from the topology client 16, in one embodiment, the topology/view server 18 may be configured to query the topology client 16 for specific resource information. Thus the data that is exchanged is determined by applying both the server's configuration and the client's configuration. The topology client 16 then receives the request, and responds. All requests/responses may be sent using a standard protocol such as HTTP and may be formatted using a common vocabulary (e.g. RDF). The topology/view server 18 only has to understand the request/response protocol and the common vocabulary in order to store the resource data. As an example, the topology/view server 18 may be configured to request from the topology client 16 information two levels deep into HTTP-type services. When the topology/view server 18 makes this request, the topology client 16 will return information relating to each separate HTTP site supported (i.e., each home page) and the resources one level deeper (i.e., one link away from the home pages). Similar requests for various levels of detail to other services such as a file system would yield views of various depths into the file system hierarchy. The topology/view server 18 may request only certain attributes at each level. For example, for a file system, the topology/view server 18 could request and store only the directory structure, or the directory structure and file names, but the not the files themselves. Other attributes that the server may track are file date/times, type, size, owner, permissions, etc.

In a second embodiment, the topology client 16 may simply push the messages containing the network resource information to the topology/view server 18 without first being requested to do so by the topology/view server 18. In response, the topology/view server 18 may filter and delete the information from the messages that the topology/view server 18 is not configured to receive.

In step 54, the topology/view server 18 determines if the message contains network resource information. If so, then in step 56 the topology/view server 18 associates a timestamp with the resource information and stores the timestamp and resource information from the message. It should be apparent that the server 18 not only receives a message from a topology client 16 when the topology client 16 connects, but also periodically receives messages during the connection. For each message, the server 18 may store a record in a repository that includes an ID of the client device 16 and a timestamp, thus storing a series of records created at different time intervals. Based on these time intervals, the topology/view server 18 can determine whether or not a device 12 is connected to the local network 14. Thus, in step 58 it can be determined which user-requestable services and data having a mime type were available on the network 14 over a predetermined time period. For example, if a topology client 16 is configured to send messages to the topology/view server 18 every 60 seconds, and if the topology client 16 then misses one or more intervals, the topology/view server 18 can infer that the corresponding device 12 is disconnected from the local network 14.

In step 60, the topology/view server 18 may generate a view of the user-requestable services and data having a MIME type that were available on the network over the predetermined time period, thereby enabling generation of current, past, and dynamic views of the user-requestable services offered by devices 12 connected to the network and the MIME-type data stored by the devices 12.

In step 62, the topology/view server 18 determines if the message includes commands to perform operations on resources, in which case the message will also include an identification of the target resource, preferably in the form of the resource ID of the target resource stored in the repository. In a preferred embodiment, example types of the operations that can be performed on the target resource include the following: invoking a particular service offered by a network device, viewing a connectivity of the resources in a topology view of the network, copying or moving resources from one network device to another network device, deleting a resource from a network devices, downloading a resource from a network device, and transmitting a copy of a resource from a network device to a device not associated with the network.

According to this embodiment, these operations are allowed whether or not the target resource is available via the network. In step 64, if the target resource is available when the command is received, then the topology/view server 18 performs the operation on the target resource. In step 66, if the resource is unavailable via the network when the command is received, the topology/the server 18 still allows the operation by performing or scheduling the operation on the corresponding resource identifier stored in the repository. If for example, the command is to delete a resource stored on a particular network device 12 and the network device 12 is not connected to the network, then the delete command is scheduled for the resource identifier stored in repository. When a network device 12 connects to the network and the target resource becomes available, the scheduled delete operation is then performed on the target resource. The commands to perform operations on resources may be issued either through the topology clients 16, or by navigating to the topology/view server 18 via a browser and issuing the command through a web interface.

Figure 3:
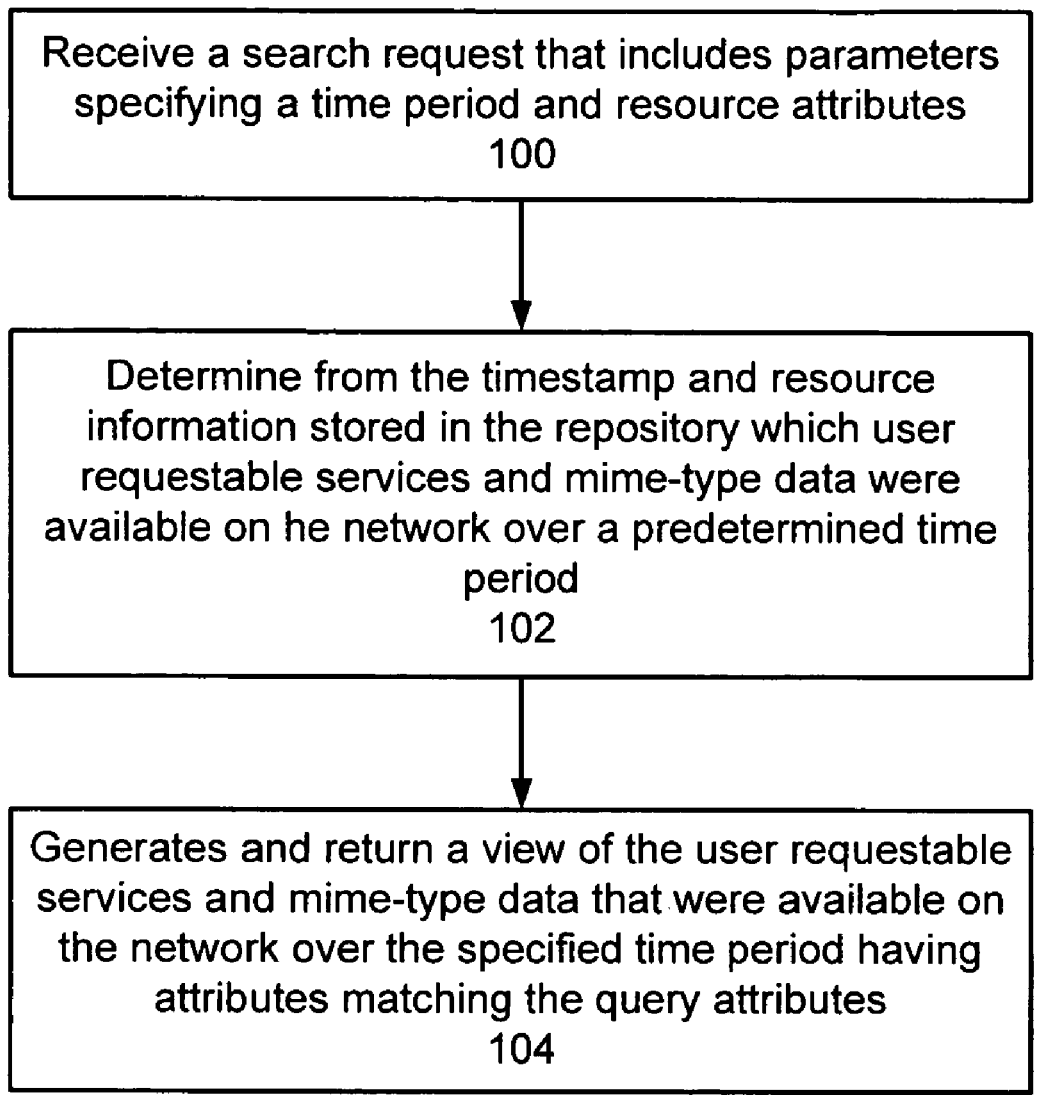
FIG. 3 is a flow diagram illustrating the process of requesting a view of the network resources through the topology/view server.

FIG. 3 is a flow diagram illustrating the process of requesting a view of the network resources through the topology/view server 18. In a preferred embodiment, the generation of a view of network resources described step 60 of FIG. 2 is performed in response to a search request. Thus, the process for requesting a view of network resources begins in step 100 by the topology/view server 18 receiving a search request that includes parameters specifying a time period and resource attributes.

In one embodiment, the topology/view server 18 includes one or more web pages that provide a search interface for enabling a user to enter the search request to view the local network resources. The user navigates to the search page using a browser, enters search criteria and transmits the search request. In an alternative embodiment, the user may use the topology client 16 of the network device 12 to send the search criteria to the topology/view server 18. Although in this embodiment, the search request originates from a user, the search request may also originate from other software applications. In another embodiment, the search request may be issued in the form of a command issued to the topology/view server 18 in a message sent from one of the topology clients 16.

In step 102, the topology/view server 18 determines from the stored timestamp and resource information which user-requestable services and mime-type data were available on the network over the specified time period. This is accomplished by the topology/view server 18 building a query from the search request and executing the query. And in step 104, the topology/view server 18 generates and returns a view of the user-requestable services and mime-type data that were available on the network over the specified time period having attributes matching the query attributes, thereby enabling generation of current, past, and dynamic views of the network topology. In a further embodiment, the view may be generated based on relationships among the user-requestable resources and mime-type data, where the default view is built using a containment relationship.

According to some embodiments, the network architecture 10 described herein provides a scaleable method for discovering and accessing resources on the local network 14 as well as discovering the resources within devices connected to the local network 14. The topology clients 16 and topology/view server 18 provide a common mechanism for discovering and accessing the resources, rather than having device or service specific access methods. In addition to discovering and accessing the resources, the embodiments provide a way to discover relationships between the various resources on the network 14 with respect to the devices and services which contain them and with respect to how they are organized within a device or service. Further, the system is extendable so that other types of relationships between the resources can be discovered.

Figure 4:
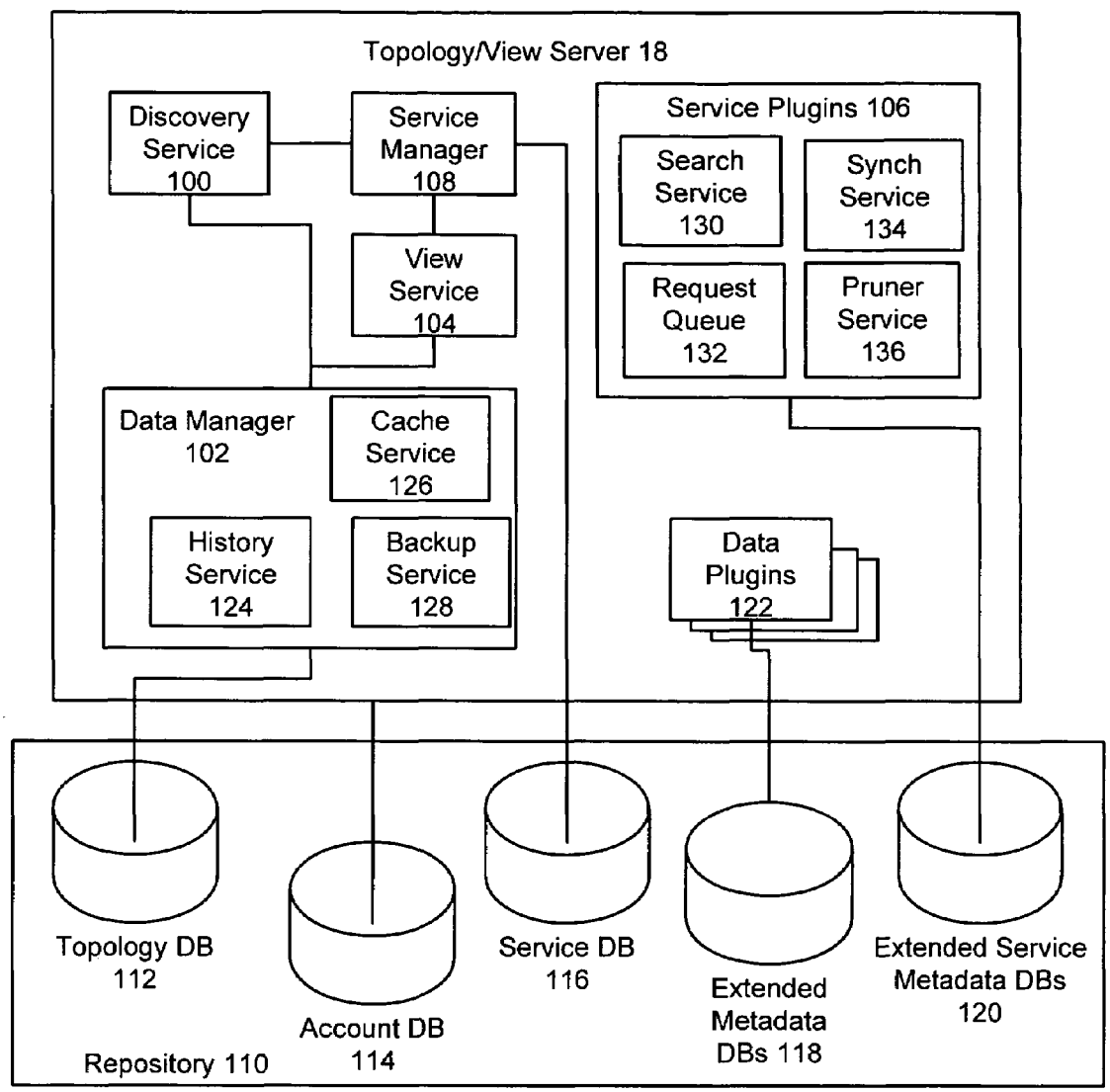
FIG. 4 is a block diagram illustrating the topology components of the topology/view server.

FIG. 4 is a block diagram illustrating in greater detail the components of the topology/view server 18. In a preferred embodiment, the topology server 20 includes a discovery service 100, a data manager 102, a view service 104, service plug-ins 106, data plug-ins 108, and repository 110. The repository 110 may be implemented as several databases such as a topology database 112 for storing the resource information, and an account database 114 for storing user account and device information. The repository 110 may also include a service database 116, one or more extended metadata databases 118, and an extended service metadata database 120.

The discovery service 100 and the data manager 102 manage communication and messages sent from the topology clients 16. The topology/view server 18 may also include a service manager 108, which is a platform that provides a common interface (e.g., an API) so that services may be written which use the resource information and service information provided by the topology clients. Data for supporting the services may be stored in the service database 16. In a preferred embodiment, the services may include functions for storing, managing, and performing operations on the resource information associated with the network devices 12 that connect to the network. An example service that may be offered for a network service is a service which caches the print drivers and setting for each of the printers on the network. The client device 16 can thus install all the network printers they need from this one service rather than by locating and connecting to each printer.

Examples of the services that may be included as part of the standard software comprising the topology/view server 18 include a view service 104, and discovery service 100. The data manager 102 may also include standard services such as a history service 124, a cache service 126, and a backup service 128. The service plug-ins 106 provide additional functions and features of the topology/view server 18 and may be added to the topology/view server 18 in the field. Examples of plug-in services 106 include a search service 130, a request queue 132, a synchronization service 134, and a pruner service 136. The services of the topology/view server 18 are explained below.

In operation, a request to locate the topology server transmitted by a topology client 16 is received by the discovery service 100. The topology/view server 18 may then make a request for the type of resource data the topology/view server 18 is configured to receive. The response sent by topology client 16 containing the resource information and a timestamp is received by the data manager 102 and passed to a history service 124. In one embodiment, the resource information and timestamp in the messages are stored as records in the topology database 112 in association with the network device from which they were sent. Through these records, a series of time periods is generated of when a particular resource is available on the network 14, and may be used to build snapshots of the network topology over a given period of time. Given that network resource information is stored in a common format and provides a network hierarchical structure, the search service 130 enables a user to construct search requests over the web.

In a preferred environment, the search service 130 enables a user to enter a search request via a web interface for searching the topology database 112. The search service 130 allows the user to specify a current time period or a past time period in order to search for resources currently on the network or that were on the network at a past time. Alternatively, search requests may be received through messages sent by the topology client 16. When a search request to search the topology database 112 is received, the request is passed to the search service 130. The search service 130 generates the queries from the search terms, queries the topology database 112, and passes the results to the view service 104 for display. The view service 104 receives results returned from the query and presents the data in text, graphical or chart format to the requester. For example, a user may request to view all network printers either presently available on the network 14 or that were available over a specified period of time, or view all resources owned by a particular user.

The data manager 102 invokes the various services depending on the type of data or command included in the message received from a topology client 16. When a message is received containing a command to perform operations on an unavailable resource (e.g., disconnected resource), the data manager 102 sends the request to the request queue 132. The request queue 132 is used to store commands issued to the unavailable resource, forward the stored commands to the unavailable resource when the resource becomes available on the network (e.g., reconnects), and to forward the response from the resource to the requesting resource if the requesting resource is present on the device 12 or otherwise available on the network. The request queue 132 is preferably implemented as a subscription service that users of topology client 16 subscribe in order to have off-line commands forwarded to their topology clients 16 where the command is automatically carried out. As described above, certain types of commands may be performed or scheduled on resource identifiers in the topology database 112 corresponding to unavailable resources.

When a message is received containing a command to synchronize two or more specified resources, the data manager 102 passes the command to the synchronization service 134. The synchronization service 134 provides synchronization services to disconnected devices. This synchronization service 134 allows a registered user to synchronize mime-type data on two or more network devices 12 regardless of whether the network devices 12 are connected to the network 14 at the same time. For example, assume that the synchronization service 134 is configured to synchronize device A with device B, and that the synchronization service 134 has the latest image of what both devices should have.

When device A connects to the network, the synchronization service 134 will record any detected changes in device A. When device B connects to the network, the synchronization service 134 will synchronize device B with the changes from device A, and any changes detected in device B will be applied to device A when device A reconnects to the network 14.

When a message is received containing a command to cache mime-type data resources, such as files, the data manager 102 passes the command to the cache service 126. The cache service 126 then fetches and caches a copy of the identified resources in the repository 110. This allows two or more topology clients 16 to exchange data regardless of whether the topology clients 16 are connected to the network at the same time. Similarly, when a message is received containing a command to back-up mime-type resources, the data manager 102 passes the command to the backup services 128, which then performs a backup operation of the specified resource.

The extended service metadata databases 120 are plug-in specific databases and include a respective database for each available service plug-in 106. That is, for each service plug-in 106 added to the topology/view server 18 requiring a database, such as the synchronization service 134, the service manager 108 may create a new extended service metadata database 120 for that plug-in. One exception is that the search service 130 uses the existing topology database 112.

The pruner service 136 may be used to control the size of the repository 110 by searching for, and deleting, the timestamp and corresponding network resources in the repository 110 that have been stored longer than a predefined time (e.g., six months, or one year).

Data plug-ins 122 are pieces of code that can be added to the system to process new or different file types or MIME types (e.g., JPEG, PDF, etc.). For example, if images are a type of data that is not currently recognized by the topology/view server 18, and an image data plug-in 122 may be provided that parses the image data and pulls out any included metadata for storage in the extended database 118 so that the image metadata is searchable.

Figure 5:
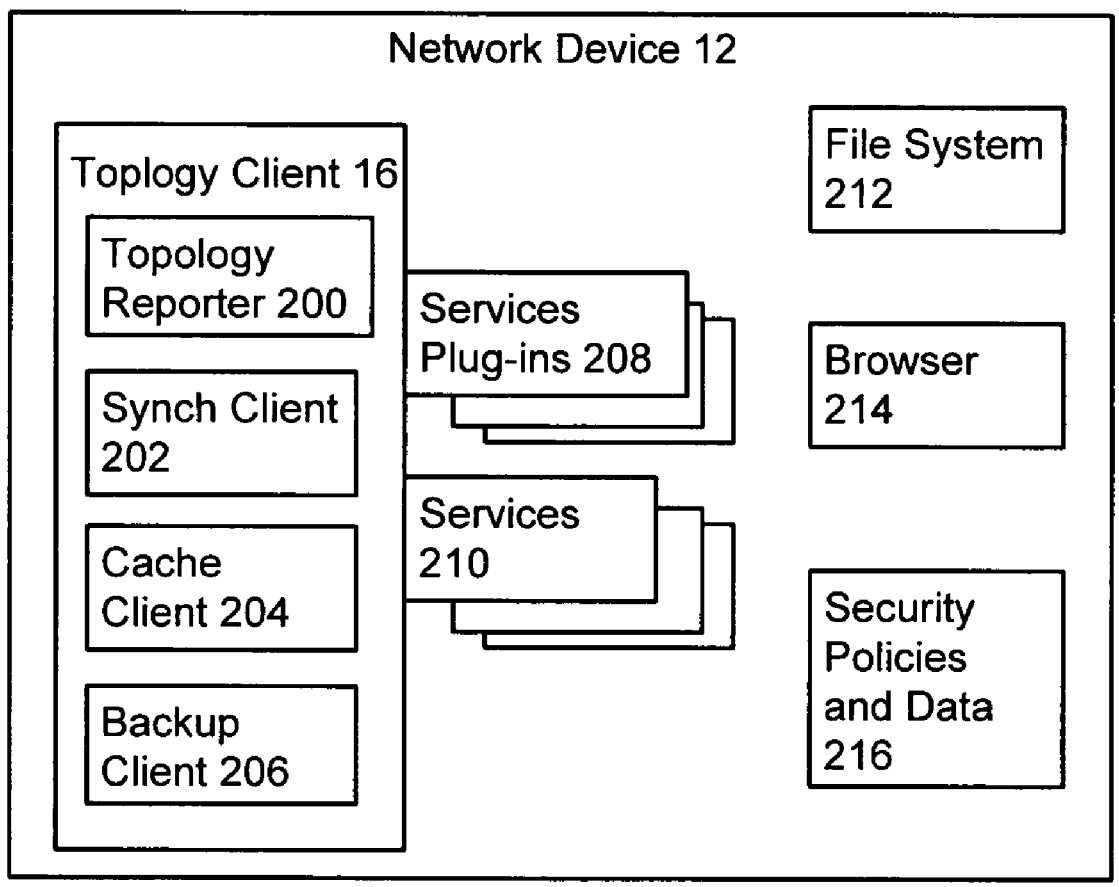
FIG. 5 is a block diagram illustrating relevant components of the network device.

FIG. 5 is a block diagram illustrating relevant components of the network device 12. In addition to the topology client 16, the network device 12 includes a file system 212, a browser 214, and security policies and data 216. The file system 212 stores various MIME-type files, preferably in a hierarchical directory structure. The browser 214 is used by the user of the network device 12 to access the search page of the topology/view server 18 and enter search criteria for network views. The security policies and data 216 provide the data for configuring the topology client 16, i.e., defines the scope and depth of the resource to make public. In one embodiment, the topology client 16 includes a topology reporter 200, which is responsible for detecting services and resources of the device 12 as configured by the security policies and data 216. The topology reporter 200 also reports the detected services and resources to the topology/view server 18.

To take advantage& of services available by the topology/view server 18, the topology client 16 is provided with matching service components, such as a synchronization client 202, a cache client 204, a backup client 206, service plug-ins 208, and services 210. The synchronization client 202 issues and receives commands for performing synchronization with another device 12 via the topology/view server 18. The cache client 202 issues and receives commands for caching data to and from the topology/view server 18. The backup client 206 issues and receives commands for backing up data to and from the topology/view server 18. And the service plug-ins 208 and services 210 mirror those on the topology/the server 18.

Figure 6:
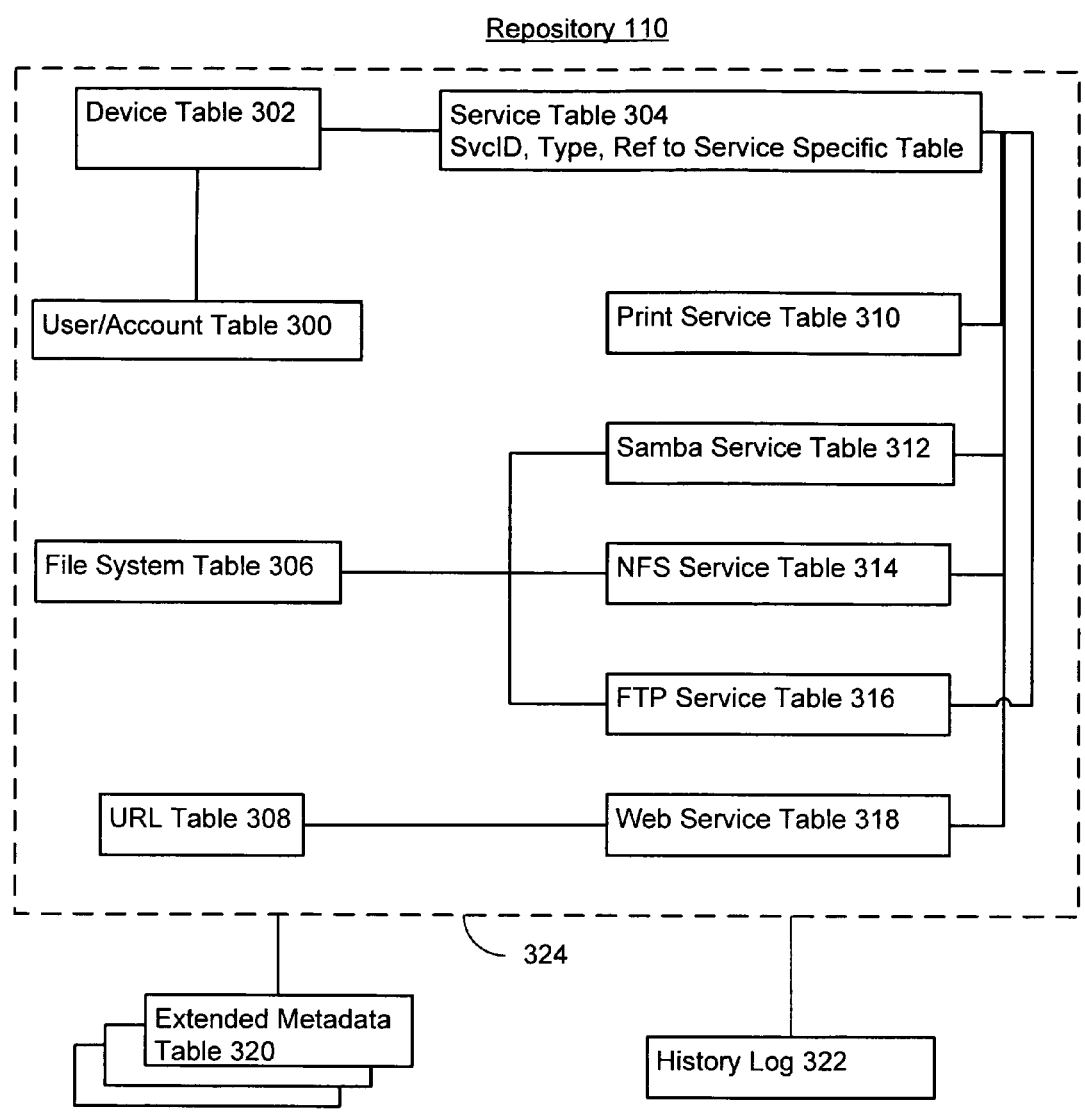
FIG. 6 is a block diagram of the tables comprising one possible database structure of the repository.

FIG. 6 is a block diagram of the tables comprising one possible database structure of the repository 110. In a preferred embodiment, the repository includes a user account table 300, a device table 302, a service table 304, a file system table 306, a URL table 308, a print service table 310, a Samba server table 312, a network file system service table 314, an FTP service table 316, a Web service table 318, one a more extended metadata tables 320, and a history log 322.

The user account table 300 may maintain account information for each registered user of the topology service. Associated with each user account are various devices 12, such as a PC and a PDA, which are all stored in the device table 302 used to registered to the user. Associated with each device 12 are history records stored in the history log 322 indicating the time each device 12 was connected to the network, their status, and the time at which they were disconnected. The history log 322 is used by each of the tables in dashed box 324 to maintain update records indicating the time when messages were received. From these update records, when a particular device 12 was connected to the network 14 or disconnected from the network 14 can be reconstructed to generate different views of the network 14.

The service table 304 maintains records indicating the set of services offered by each device 12. Each service may have a record indicating its service ID, the type of service, and a reference to a specific service table created for that service.

The repository 110 also includes a number of subtype services where extended data is kept, such as the print service table 310, the file system table 306, and the URL table 308. The file system table 306 stores information regarding individual files stored by the network devices 12 and makes use of the SAMBA service table 212, the network file service (NFS) service table 314, and the file transfer protocol (FTP) service table 216. The SAMBA service table 312 maintains records of files that can be found through a Windows networking service. The NFS service table 314 maintains records of files that can be found through a UNIX networking service. And the FTP service table 316 maintains records of files provided through FTP.

Some network devices 12 on a network 14 may be configured as servers. In this case, the URLs associated with the servers are stored in the URL table 308, and the services provided by the servers are stored in the web service table 318. The extended metadata tables 320 are used by various plug-ins that recognize different data types to store metadata extracted from objects of the respective data types.

No specific databases from FIG. 4 are shown in FIG. 6 because the tables described in FIG. 6 may span various databases. The lines between the tables show the relationships between the tables. For example all the tables and the dashed box 324 may all interact with the extended metadata tables 20 and the history log 322.

In order to more fully explain the features and benefits of the preferred embodiment, consider the following example scenario in which a user returns home from a day-trip to the mountains taking pictures of the fall colors with a wireless network-enabled camera. The user turns the camera on and sets it on the kitchen table. The camera connects to the user's wireless LAN. The user has a server configured to serve as the view/topology server 18 using a well-known name/address (or which is obtained via a DHCP server). The camera sends a message using the well-known address that it is present and the scope and depth of the resource information it is willing to make public. The server 18 receives the message and sends a request to the camera querying only the information it is configured to store from the information available from the camera. The camera receives the request, and responds. All requests/responses are sent using a standard protocol such as HTTP and are formatted using a common vocabulary (e.g. RDF). The camera returns a response message containing resource information indicating that it is a still camera, it hosts a web server and provides its URL, it hosts an FTP server, and it sends a list of file types it has stored in its local storage (using mime/types) and the number of each. The server only has to understand the request/response protocol and the common vocabulary to store the data in a database repository. Each service type may be associated with a server plug-in which is specific to the service type and can communicate with the server to provide extended data and services, but this is not required to build the repository, fetch data, or access discovered services.

By this time the user is sitting on the couch in the living room, turns on his TV connected to his media center PC. He brings up the user interface for the topology/view server and selects the category for web servers. He sees the link for the camera's web server selects it and browses the images on the camera (operating on them as the camera's web app allows). He returns to the topology/view server. Enters a query for all images taken on the current date. The images on his camera and those imported into his photo organizing application both appear. He sets a filter to see only HTTP links (not SAMBA or ftp links). He selects one which takes him to a URL processed by the photo organizing applications web interface.

The user turns off his camera. His wife wants to see all the pictures he took. She's at the family PC. She brings up the topology/view server and searches for available web sites. Since the server has been configured as a caching server configured to cache web pages, it has cached the camera's web pages. She browses the cached pages.

The following are examples of what can be done with this resource information:

View browse it (or just parts of the information, such as browse the network file systems from a unified directory tree).

Search it based on the attributes available

Request a resource or additional info about the resource. If the server doesn't store the data requested the request is sent to the device containing the resource. If the device is not present, the user may have the request queued, so that when the device appears on the network the request is made. The data will be held until the requesting resource is available.

Users and applications may subscribe to events related to the data in the server. Examples, include (new device attaches, returning devices attaches or detaches, new file, modified file, deleted file, new account on an ftp service, etc).

A photosharing/organizing application can subscribe to the appearance of new images on connected devices. When it receives an event it requests the images. This is a much simpler solution that having the software detect every device on the network that may contain images and query those images directly.

Caching service/backup services. Each resource can be configured to be backed up with or without versioning, or simply have its most recent copy cached for a specified period time so that it is available when the device is offline.

Plugins for various services like printers may be added to allow files to be submitted for printing when the printer is offline.

A method and system for processing operations associated with resources on a local network has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim:

1. A method for processing operations associated with resources on a local network, comprising;

receiving periodic messages containing resource information from network devices connected to the local network wherein the resource information includes at least one of user-requestable services offered by the network device and data stored by the network device having a MIME type;

storing a timestamp and resource information from each of the messages in a repository;

determining from the stored timestamp and resource information which of the at least one of user-requestable services and data having a MIME type were available on the network over a predetermined time period, wherein the predetermined time period includes a past time period which is different from a present time period; and generating a view of the at least one of user-requestable services and data having a MIME type that were available on the network over the predetermined period, including the past time period, thereby enabling generation of current, past, and dynamic views of the at least one of user-requestable services offered by devices connected to the network and the data having a MIME type stored by the devices.

2. The method of claim 1 further including: performing the method in a mobile network device, wherein the local network is defined as any local network the mobile device connects with over a period of time.

3. The method of claim 1 further including: performing the method using a server that is part of a topology service site accessible over the network.

4. The method of claim 1 wherein receiving periodic messages further includes: detecting the network devices present on the network, and detecting a scope and depth of the resource information the network devices are willing to make public.

5. The method of claim 4 further including: providing at least a portion of the network devices with a topology client application, and providing a network topology/view server, wherein the topology client application transmits the messages from the network devices to the network topology/ view server, and the network topology/view server generates the view of the at least one of user-requestable services and data having a MIME type.

6. The method of claim 5 further including: providing the network topology/view server with services and a repository for storing, managing, and performing operations on the resource information associated with the network devices that connect to the network.

7. The method of claim 6 further including: providing the network topology/view server with a search service for enabling a user to enter a search request via a web interface, and to specify a past time period in order to search for resources that were on the network at a past time.

8. The method of claim 6 further including: providing the network topology/view server with a synchronization service that synchronizes the data having a MIME type between at least two network devices regardless of whether the two network devices are connected to the network at the same time.

9. The method of claim 6 further including: providing the network topology/view server with a pruning service for deleting the timestamp and resource information stored in the repository that have been stored longer than a predefined time.

10. The method of claim 6 further including: providing the network topology/view server with a cache service for caching the data having a MIME type from the network devices to allow the network devices to exchange data regardless of whether the network devices are connected to the network at the same time.

11. The method of claim 6 further including: providing the network topology/view server with a backup service for backing up the data having a MIME type from the network devices.

12. The method of claim 5 further including: initiating detection of the network devices on the network by the network topology/view server.

13. The method of claim 12 further including: initiating detection of the network devices on the network by the network devices.

14. The method of claim 1 further including:
receiving a search request specifying a time period and query attributes, wherein the specified time period includes a past time period that is different from a present time period; and
generating a view of the resources that were available on the network during the specified time period having attributes matching the query attributes.

15. The method of claim 1 further including: storing a resource identifier for each resource in the repository, and allowing operations associated with the resources to be performed or scheduled at a time when the resources are unavailable via the network by performing or scheduling the operations on the corresponding resource identifiers stored in the repository.

16. The method of claim 15 further including: receiving messages containing commands to perform operations on resources identified in the repository.

17. The method of claim 16 further including: providing operations including at least one of invoking a particular service offered by a network device, viewing a connectivity of the resources in a topology view of the network, copying or moving resources from one network device to another network device, deleting a resource from a network devices, downloading a resource from a network device, and transmitting a copy of a resource from a network device to a device not associated with the network.

18. The method of claim 17 further including: performing the scheduled operations on the resources at a time when the resources are available via the network.

19. A network system for a local network, comprising:
one or more network devices capable of communicating with the local network, at least a portion of the network devices including a client application for gathering resource information regarding the respective network device in which it resides, wherein the resource information includes at least one of user-requestable services offered by the network device and data stored by the network device having a MIME type; and
at least one server configured to provide a topology service for the network devices through the client applications, the server performing functions for,
receiving periodic messages containing resource information transmitted from the topology clients connected to the local network;
storing a timestamp and resource information from each of the messages in a repository;
determining from the stored timestamp and resource information which of the at least one of user-requestable services and data having a MIME type were available on the network over a predetermined time period, wherein the predetermined time period includes a past time period which is different from a present time period; and
generating a view of the at least one of user-requestable services and data having a MIME type that were available on the network over the predetermined period, including the past time period, thereby enabling generation of current, past, and dynamic views of the at least one of user-requestable services offered by devices connected to the network and the data having a MIME type stored by the devices.

20. The network system of claim 19 wherein the server is implemented in a mobile network device, wherein the local network is defined as any local network the mobile device connects with over a period of time.

21. The network system of claim 19 wherein the server is part of a topology service site accessible over the network.

22. The network system of claim 19 wherein the server further detects the network devices present on the network, and detects a scope and depth of the resource information the client applications are willing to make public.

23. The network system of claim 22 wherein the server includes a discovery service and a data manager for managing communication and messages sent from the client applications.

24. The network system of claim 23 wherein the server further includes a service manager that provides a common interface for adding additional services, wherein the additional services include functions for storing, managing, and performing operations on the resource information associated with the network devices that connect to the network.

25. The network system of claim 24 wherein the server further includes a synchronization service that synchronizes the data having a MIME type between at least two network devices regardless of whether the two network devices are connected to the network at the same time.

26. The network system of claim 24 wherein the server further includes a pruning service for deleting the timestamp and resource information stored in the repository that have been stored longer than a predefined time.

27. The network system of claim 24 wherein the server further includes a cache service for caching the data having a MIME type from the network devices to allow the network devices to exchange data regardless of whether the network devices are connected to the network at the same time.

28. The network system of claim 24 wherein the server further includes a backup service for backing up the data having a MIME type from the network devices.

29. The network system of claim 24 wherein the client application includes service components matching those in the server, including any combination of a synchronization client, a cache client, a backup client, and service plug-ins.

30. The network system of claim 19 wherein the server is further capable of receiving a search request specifying a time period and query attributes, wherein the specified time period includes a past time period that is different from a present time period, and generating a view of the resources that were available on the network during the specified time period having attributes matching the query attributes.

31. The network system of claim 30 wherein the server further includes a search service for enabling a user to enter the search request via a web interface, and to specify a past time period in order to search for resources that were on the network at a past time.

32. The network system of claim 19 wherein the server stores a resource identifier for each resource in the repository, and allows operations associated with the resources to be performed or scheduled at a time when the resources are unavailable via the network by performing or scheduling the operations on the corresponding resource identifiers stored in the repository.

33. The network system of claim 32 wherein the server receives messages containing commands to perform operations on resources identified in the repository.

34. The network system of claim 33 wherein the operations including at least one of at least one of invoking a particular service offered by a network device, viewing a connectivity of the resources in a topology view of the network, copying or moving resources from one network device to another network device, deleting a resource from a network devices, downloading a resource from a network device, and transmitting a copy of a resource from a network device to a device not associated with the network.

35. The network system of claim 34 wherein the scheduled operations are performed on the resources at a time when the resources are available via the network.

36. A computer-readable medium containing program instructions for processing operations associated with resources on a local network, the program instructions for;
receiving periodic messages containing resource information from network devices connected to the local network wherein the resource information includes at least one of user-requestable services offered by the network device, and data stored by the network device having a MIME type;
storing a timestamp and resource information from each of the messages in a repository;
determining from the stored timestamp and resource information which of the at least one of user-requestable services and data having a MIME type were available on the network over a predetermined time period, wherein the predetermined time period includes a past time period which is different from a present time period; and
generating a view of the at least one of user-requestable services and data having a MIME type that were available on the network over the predetermined period, including the past time period, thereby enabling generation of current, past, and dynamic views of the at least one of user-requestable services offered by devices connected to the network and the data having a MIME type stored by the devices.

37. A method for processing operations associated with resources on a local network, comprising;
receiving periodic messages including identifiers of resources from one or more network devices connected to the network, wherein the resources include at least one of services offered by the network devices and data stored by the network devices;
storing the resource identifiers from each of the messages in a repository; and
allowing operations associated with the resources to be performed or scheduled at a time when the resources are unavailable via the network by performing or scheduling the operations on the corresponding resource identifiers stored in the repository.

38. The method of claim 37 further including: providing operations including at least one of invoking a particular service offered by a network device, viewing a connectivity of the resources in a topology view of the network, copying or moving resources from one network device to another network device, deleting a resource from a network devices, downloading a resource from a network device, and transmitting a copy of a resource from a network device to a device not associated with the network.

39. The method of claim 38 further including: carrying out the scheduled operations on the resources at a time when the resources are available via the network.

40. The method of claim 39 further including: receiving the operations in messages that include a command and an identification of a target resource, and storing the command in a request queue if the target resource is unavailable.

41. The method of claim 37 further including:
associating a timestamp with the resource identifiers in the periodic messages; storing the timestamp and resource information from each of the messages in the repository;
determining from the stored timestamp and resource information which of the at least one of user-requestable services and data having a MIME type were available on the network over a predetermined time period, wherein the predetermined time period includes a past time period which is different from a present time period; and
generating a view of the at least one of user-requestable services and data having a MIME type that were available on the network over the predetermined period, including the past time period, thereby enabling generation of current, past, and dynamic views of the at least one of user-requestable services offered by devices connected to the network and the data having a MIME type stored by the devices.

42. The method of claim 37 further including: performing the method in a mobile network device, wherein the local network is defined as any local network the mobile device connects with over a period of time.

43. The method of claim 37 further including: performing the method using a server that is part of a topology service site accessible over the network.

44. A network system for a local network, comprising:
one or more network devices capable of communicating with the local network, at least a portion of the network devices including a client application for gathering resource information regarding the respective network device in which it resides, wherein the resource information includes at least one of services offered by the network device and data stored by the network device; and at least one server configured to provide a topology service for the network devices through the client applications, the server performing functions for, receiving periodic messages including identifiers of resources from the client applications in network devices connected to the network, wherein the resources include at least one of services offered by the network devices and data stored by the network devices;

storing the resource identifiers from each of the messages in a repository; and allowing operations associated with the resources to be performed or scheduled at a time when the resources are unavailable via the network by performing or scheduling the operations on the corresponding resource identifiers stored in the repository.

45. The network system of claim 44 wherein the operations including at least one of invoking a particular service offered by a network device, viewing a connectivity of the resources in a topology view of the network, copying or moving resources from one network device to another network device, deleting a resource from a network devices, downloading a resource from a network device, and transmitting a copy of a resource from a network device to a device not associated with the network.

46. The network system of claim 45 wherein the scheduled operations are carried out on the resources at a time when the resources are available via the network.

47. The network system of claim 46 wherein the operations are included in messages that include a command and an identification of a target resource, and storing the command in a request queue if the target resource is unavailable.

48. The network system of claim 44 wherein the server further includes functions for;

associating a timestamp with the resource identifiers in the periodic messages;

storing the timestamp and resource information from each of the messages in the repository;

determining from the stored timestamp and resource information which of the at least one of user-requestable services and data having a MIME type were available on the network over a predetermined time period, wherein the predetermined time period includes a past time period which is different from a present time period; and generating a view of the at least one of user-requestable services and data having a MIME type that were available on the network over the predetermined period, including the past time period, thereby enabling generation of current, past, and dynamic views of the at least one of user-requestable services offered by devices connected to the network and the data having a MIME type stored by the devices.

49. The network system of claim 44 wherein the server is implemented in a mobile network device, wherein the local network is defined as any local network the mobile device connects with over a period of time.

50. The network system of claim 44 wherein the server is part of a topology service site accessible over the network.

51. A computer-readable medium containing program instructions for processing operations associated with resources on a local network, the program instructions for;

receiving periodic messages including identifiers of resources from one or more network devices connected to the network, wherein the resources include at least one of services offered by the network devices and data stored by the network devices;

storing the resource identifiers from each of the messages in a repository; and allowing operations associated with the resources to be performed or scheduled at a time when the resources are unavailable via the network by performing or scheduling the operations on the corresponding resource identifiers stored in the repository.

* * * * *

UNITED STATES PATENT AND TRADEMARK OFFICE
CERTIFICATE OF CORRECTION

PATENT NO. : 7,292,579 B2  Page 1 of 1
APPLICATION NO. : 11/117907
DATED : November 6, 2007
INVENTOR(S) : Robert P. Morris It is certified that error appears in the above-identified patent and that said Letters Patent is hereby corrected as shown below:

In the Claims:

Column 15, line 64, "devices" should read --device--

Column 17, line 33, after "including" delete "at least one of"

Column 17, line 38, "devices" should read --device--

Column 18, line 22, "devices" should read --device--

Column 19, line 25, "devices" should read --device--

Signed and Sealed this

Eleventh Day of November, 2008

JON W. DUDAS
*Director of the United States Patent and Trademark Office*